United States Patent [19]

Inam et al.

[11] Patent Number: 5,436,512

[45] Date of Patent: Jul. 25, 1995

[54] POWER SUPPLY WITH IMPROVED CIRCUIT FOR HARMONIC PARALLELING

[75] Inventors: Haroon Inam; Robert W. Johnson, Jr.; William J. Raddi, all of Raleigh, N.C.

[73] Assignee: Exide Electronics Corporation, Raleigh, N.C.

[21] Appl. No.: 950,912

[22] Filed: Sep. 24, 1992

[51] Int. Cl.6 ............................. H02J 3/06; H02J 3/46
[52] U.S. Cl. ......................................... 307/58; 307/20; 307/105; 363/41; 363/71
[58] Field of Search ....................... 307/52, 53, 55, 58, 307/64–66, 60, 82, 22, 20, 19, 18, 105; 363/71, 40, 41, 97, 98, 95; 323/281

[56] References Cited

U.S. PATENT DOCUMENTS

| | | | |
|---|---|---|---|
| 3,621,365 | 11/1971 | Beck et al. | 32/27 |
| 3,675,037 | 7/1972 | Hamilton | 307/51 |
| 4,114,048 | 9/1978 | Hull et al. | 307/53 |
| 4,276,590 | 6/1981 | Hansel et al. | 363/71 |
| 4,609,828 | 9/1986 | Small | 307/44 |
| 4,733,341 | 3/1988 | Miyazawa | 363/71 |
| 4,748,340 | 5/1988 | Schmidt | 307/53 |
| 4,835,411 | 5/1989 | Takeda | 307/105 |
| 5,177,676 | 1/1993 | Inam et al. | 363/97 |
| 5,257,180 | 10/1993 | Sashida et al. | 363/71 |

*Primary Examiner*—Todd Deboer
*Assistant Examiner*—Richard T. Elms
*Attorney, Agent, or Firm*—Woodcock Washburn Kurtz Mackiewicz & Norris

[57] ABSTRACT

A UPS device adapted for parallel connection to a load along with one or more other UPS devices, having circuitry for sharing of the load, including load harmonics. A feedback network has an error signal circuit which generates an error signal representative of the difference between the actual current provided by the device and the designated share of current it should provide. The error signal is transformed by a value representative of the effective output impedance of the UPS inverter, whereby the inverter is controlled to share the fundamental of the load current as well as the harmonics.

16 Claims, 3 Drawing Sheets

POWER SUPPLY WITH IMPROVED CIRCUIT FOR HARMONIC PARALLELING

BACKGROUND OF THE INVENTION

1. Field of the Invention

This invention relates to power supply circuits, and particularly uninterrupted power supply (UPS) circuits adapted to have paralleled DC-to-AC inverters across a load.

2. Description of the Prior Art

Paralleling of UPS systems, in particular DC-to-AC inverters, is known in the prior art. Such paralleling is used to provide redundancy in situations calling for stringent maintenance of power to critical loads such as computer systems, aircraft, and the like. Thus, a redundant system consists of at least two independent supplies which are connected in parallel, each of which supplies can carry the entire load. If one UPS fails for any reason, the other or others maintain system operation. In other applications, paralleling is required to provide the capacity to service a given load. For example, two or more UPS units of a given or different ratings may be needed to service a given load. Alternately, in a situation where one UPS may be able to handle a load when operating at maximum output, two or more units may be used in parallel to achieve the desired capacity, providing both redundancy and greater reliability due to operating each supply below its rated capacity.

Typically, paralleling of the output DC-to-AC inverters has been accomplished by controlling the amplitude and phase of the reference voltage to the inverter using a demodulator and modulator scheme. This scheme is costly and does not help in transient sharing; only the fundamental component of the current is shared. Further, this arrangement is generally not viable for paralleling inverters of different power ratings without substantial circuit changes.

An example of an attempt to balance load supplied by plural UPS units is disclosed in U.S. Pat. No. 4,114,048. There, the circuit is designed to balance load current through the respective inverters, but not load provided at the inverter outputs. Also, this design makes no attempt to balance harmonics.

Present day UPS applications have made it more critical that paralleled UPS units be able to provide balanced sharing of harmonics. Many UPS loads, such as computer loads, include significant transient conditions, resulting in harmonics. If such harmonics are not shared properly, but are distributed in an unbalanced way, the lifetime of a UPS unit can be significantly reduced. In some instances, unbalanced sharing of harmonics can even cause relatively quick failure. There is, thus, a need in the art for a UPS design enabling harmonic paralleling of the DC-to-AC inverter outputs of UPSs, enabling each UPS to share harmonic-rich loads such as presented by computers. What is needed is a UPS design that provides for sharing of subharmonic and higher harmonic currents, thereby enabling paralleling for supplying a nonlinear load. At the same time, there is a need for a simple and efficient manner of paralleling inverter outputs of UPS units so that each unit shares the load current as a ratio of its power rating to the power rating of the other parallel inverters.

SUMMARY OF THE INVENTION

It is an object of this invention to provide a UPS design whereby the output DC-to-AC inverters are paralleled, which includes generating an error signal which forces transient sharing of harmonic currents, thereby enabling balanced paralleling of UPS units for supplying a nonlinear load.

It is further an object of this invention to provide a simple and efficient circuit design for enabling paralleling of UPS units of different power ratings, so as to provide both needed capacity and redundancy for supplying a nonlinear load.

In accordance with the above objects, the present invention recognizes that load sharing control must take into account the internal impedance of the output inverter, in order to correct for any imbalance in the harmonics delivered to the load. Thus, in the prior art, paralleling arrangements have assumed a fixed value of equivalent internal impedance of the inverter circuit, such that feedback control of the fundamental voltage and phase from the inverter does not provide any harmonic control. In this invention, a current error signal is multiplied by a representation of the inverter impedance so as to generate a feedback signal that has a frequency spectrum covering the load current harmonics. In addition to conventional forward compensation and voltage feedback compensation, a current error signal is developed and modified by a paralleling compensation circuit to develop a control component which nulls the detected current error at the harmonics as well as fundamental of the load current. An operational amplifier is utilized to effectively multiply the current error signal by the output inverter impedance to provide nulling compensation at the harmonic frequencies. Additionally, a simple resistive network is utilized to control current load provided by each unit in proportion to its rated share of the total load.

DESCRIPTION OF THE PREFERRED EMBODIMENT

Figure 1:
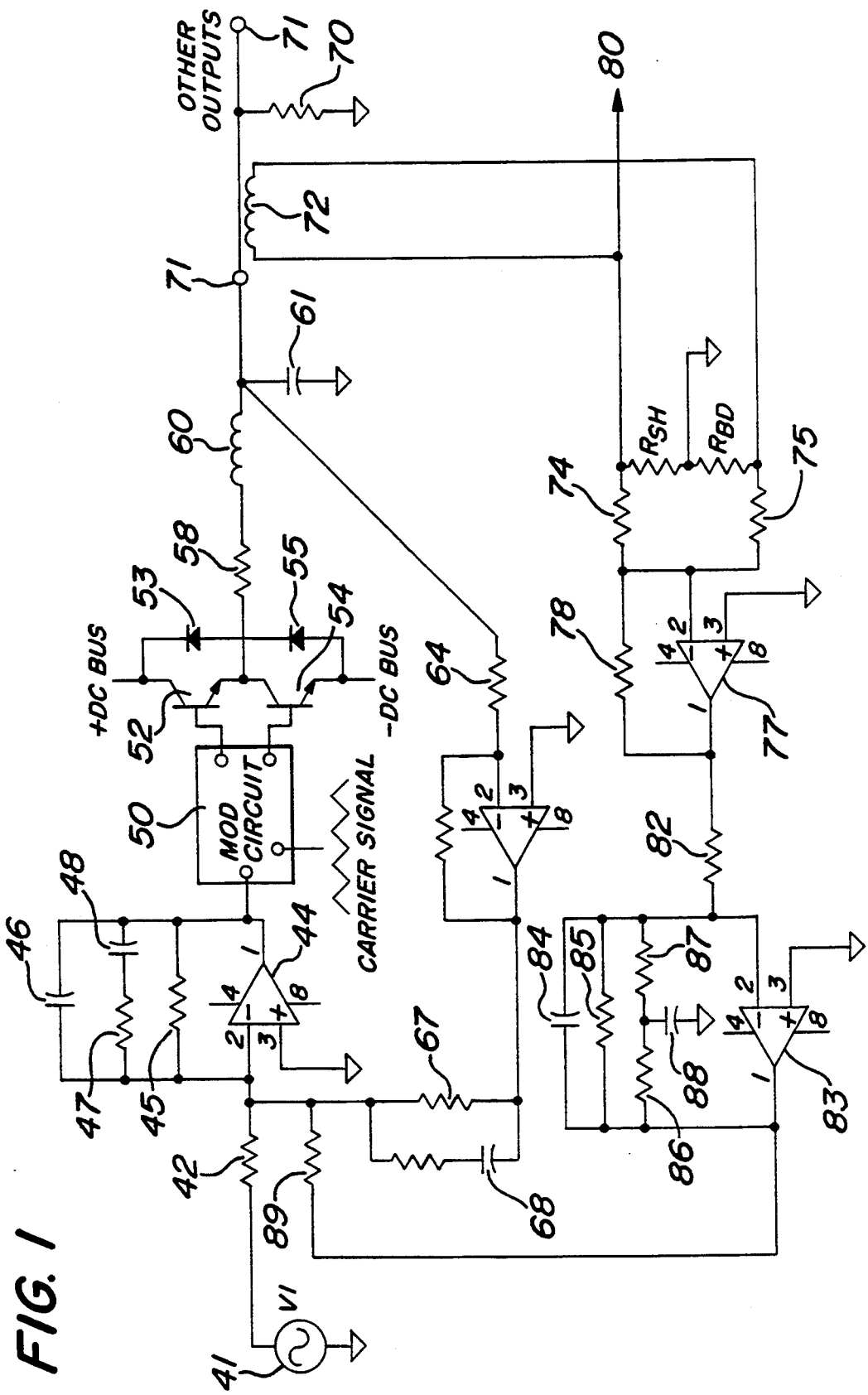
FIG. 1 is a circuit diagram of a specific preferred embodiment implementing the invention.

FIG. 1 represents a circuit diagram of a DC-to-AC inverter in accordance with the invention. It is to be noted that this circuit is a specific implementation which is illustrative of the scope of the invention, and that equivalent implementations may be utilized. For example, a specific implementation of simulating the internal impedance of the inverter is shown, it being understood that many other equivalent circuit implementations are feasible and within the scope of the invention. Also, it is understood by those familiar with the UPS art that the inverter is only part of the entire UPS device. Table 1 provides typical values of components of the circuit of FIG. 1.

TABLE 1

| | |
|---|---|
| 42 - 2K | 74 - 10K |
| 45 - 15K | 75 - 10K |
| 46 - 1000 pF | 78 - 1K |
| 47 - 5K | 82 - 10K |
| 48 - 33 nF | 84 - 163 pF |
| 58 - 0.02 | 85 - 167K |
| 60 - 1.075 mh | 86 - 50 |
| 61 - 9.4 μF | 87 - 50 |

TABLE 1-continued

| | |
|---|---|
| 64 - 10K | 88 - 2 µF |
| 66 - 10K | 89 - 2K |
| 67 - 150K | |
| 68 - 10K, 22 nF | |

Referring now to FIG. 1, there is shown a circuit diagram of a currently preferred embodiment of a UPS inverter circuit with feedback arrangement, for paralleling the inverter output to a load 70. A reference signal V1, indicated at 41, is the command signal used by the inverter to control the device output waveform. The reference is generally sinusoidal to emulate commonly available utility voltage, but need not be sinusoidal, i.e., it can be a square wave, triangular wave, or a sinusoidal wave with higher harmonics. Thus the inverter, in a well-known manner, takes a DC input and produces an AC output with the frequency and phase of the reference signal.

The inverter signal is connected through a resistor 42 to an inverting terminal of operational amplifier 44. The other input terminal is connected to ground. Impedance components connected between the input and output of amplifier 44 provide forward compensation to the signal. As shown, this impedance comprises a resistor 45 in parallel with a capacitor 46, in parallel with a series combination of resistor 47 and capacitor 48. Representative values of these elements, as well as other elements shown in FIG. 1 are set forth in Table 1. Additional signals are added to the active input of amplifier 44, as also discussed hereinbelow. A modulator circuit 50, shown in FIG. 1 as MOD CIR, receives the output of amplifier 44, as well as a carrier signal, illustrated as a triangular voltage. The modulator is a conventional modulator, comprising a comparator, circuitry to introduce current limiting, control the time between switching transistors, monitor the turn-on/turn-off pulses to the power transistors, and the switch drive circuitry. The output of the modulator is connected as illustrated to power switches 52 and 54, which connect to a positive DC bus and negative DC bus respectively. Switch 52 is shunted by a diode 53, and switch 54 is shunted by a diode 55. Although the switches are shown as bipolar transistors, other equivalent components may be used; the anti-parallel diodes may or may not be intrinsic to the switches. The modulated output of the transistors is taken from the common node between the two transistors, and connected through resistor 58 to a filter circuit comprising inductor 60 and capacitor 61. The output AC voltage developed across capacitor 61 is generated between node 71 and ground reference. The output filter is included to attenuate the carrier component and higher order harmonics from the voltage at the transistor common point.

The load 70 being driven by the UPS is connected between node 71 and ground reference. As also indicated in FIG. 1, node 71 is connected to the output of one or more other UPS units or independent modules which are connected parallel to provide load current to the load. It is to be understood that while the load is represented by a resistive symbol, in practice the load may be any complex load and particularly, as discussed above, a nonlinear load resulting in harmonic generation.

Still referring to FIG. 1, the output from node 71 is connected through resistor 64 to amplifier 65, which is shunted between output and input by resistor 66. The voltage feedback signal developed at the output of amplifier 65 is fed through the circuit indicated by resistor 67 and resistor-capacitor series combination 68, back to the active input terminal of amplifier 44. This feedback loop corrects DC-bus and load variations.

A current transformer, indicated at 72, measures the output current provided from the inverter output to load 70. For purposes of the following discussion, it is assumed that the current transformer secondary acts as a current controlled source, providing a current that is representative of the load current being delivered by the UPS unit. In practice, a current transformer or other shunt arrangement can reliably provide such a current controlled source.

Figure 2:
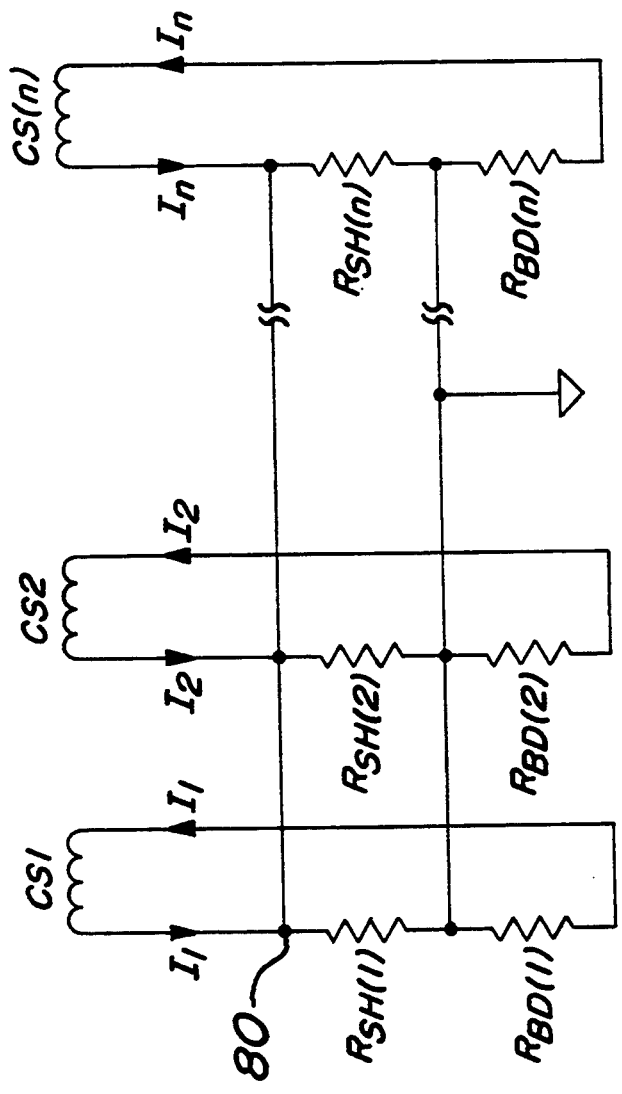
FIG. 2 is a circuit diagram of the resistive network of this invention from which an error signal for each UPS is derived.

The output of current source 72 is connected across a series resistive combination of resistor $R_{SH}$ and $R_{BD}$. The node between $R_{SH}$ and $R_{BD}$ is tied to ground. Similarly for each other unit, as is shown in FIG. 2, the current transformer or current sensing element CS (n) is connected across a corresponding series combination of $R_{SH(n)}$ and $R_{BD(n)}$, and the node between each $R_{SH}$ and $R_{BD}$ is connected through to ground. The other side of each $R_{SH}$ is connected in common to node 80, as indicated. Thus, each of $R_{SH(l)}$ through $R_{SH(n)}$ is connected in parallel, such that the sum of the current source currents $I_l$ through $I_n$ flows through the parallel combination of the $R_{SH}$ resistors. As is discussed further hereinbelow, for each UPS unit, $R_{SH}$ is made equal to $R_{BD}$; and $R_{SH}$ is chosen to have a value relative to the other $R_{SH}$ resistors that is inversely proportional to the relative amount of load current it provides. Where each UPS unit has the same power rating and is to deliver the same current to the load, the common voltage developed across each $R_{SH}$ is representative of average current. Where the UPS units carry different ratings and thus are designed to provide different contributions to load current, the current through $R_{SH(n)}$ represents the current that such particular UPS unit should be carrying, while the current through $R_{BD(n)}$ represents the current that the nth unit actually is providing.

Still referring to FIG. 1, the voltages across $R_{SH}$ and $R_{BD}$, relative to ground, are connected through resistors 74 and 75 to a first terminal of operational amplifier 77. The other terminal is grounded, and resistor 78 is shunted between the active input terminal and the output of amplifier 77. By this arrangement, the relative plus and minus voltages developed across the two resistors are added in the amplifier, providing a difference signal representative of the difference between voltage $V_{SH}$ across $R_{SH}$ and $V_{BD}$ across $R_{BD}$. This error signal is connected through resistor 82 to an active input terminal of amplifier 85, the other input terminal being grounded. An impedance, which we designate Z, shunts the amplifier between the input terminal and the output terminal, such that the signal from amplifier 77 is effectively multiplied by a value representative of Z. The output of amplifier 83 is connected through resistor 89 to be added to the signal that goes into amplifier 44, thereby providing a paralleling compensation feedback signal.

The significance of the Z multiplication will now be explained. At any given operating moment, the difference between the two voltage inputs to amplifier 77 is inversely proportional to the internal impedance of the inverter circuit, i.e., the impedance "seen" looking back toward the inverter between node 71 and ground. This impedance is sometimes referred to as the Thevenin equivalent, i.e., that effective impedance which, when placed in series with an effective ideal voltage, would provide the output of the inverter circuit between node 71 and ground. The feedback signal which is fed into amplifier 44 can change the effective voltage source of the inverter, which in turn changes the output current. In order to compensate for the harmonics in the load current, the error signal that is fed back to amplifier 44 must reflect the inverter effective impedance, in order to produce a change in the harmonic content of the output current. Thus, if the feedback circuit provided only an error signal at the fundamental, there would be no correction, and thus no balancing of the harmonic content of the current output.

In the arrangement of this invention, the effective output impedance of the inverter is essentially recreated in the paralleling compensation circuit Z, so as to control the output voltage amplitude and phase over the frequency range of the inverter. Stated in another way, since the error signal that is inputted into amplifier 77 is proportional to the inverse of the output impedance of the inverter, the error signal is transformed by a transformation function which is proportional to the output impedance Z over the frequency range of interest. Thus, the paralleling compensation-circuit transfer function (PCCTF) is an impedance which is the same as the output impedance of the inverter. It is to be noted that the circuit configuration shown in FIG. 1 is illustrative and is only one implementation of PCCTF. Vastly different but functionally equivalent circuits can also simulate the transfer function. Thus, in a microprocessor-based adaptive control technique, the PCCTF may be an equation in software with the coefficients of the equation either predetermined or being dynamically calculated from measurements. Thus, software and other hardware embodiments are, within the scope of this invention, equivalent to the illustrative circuit presented in FIG. 1.

Figure 3:
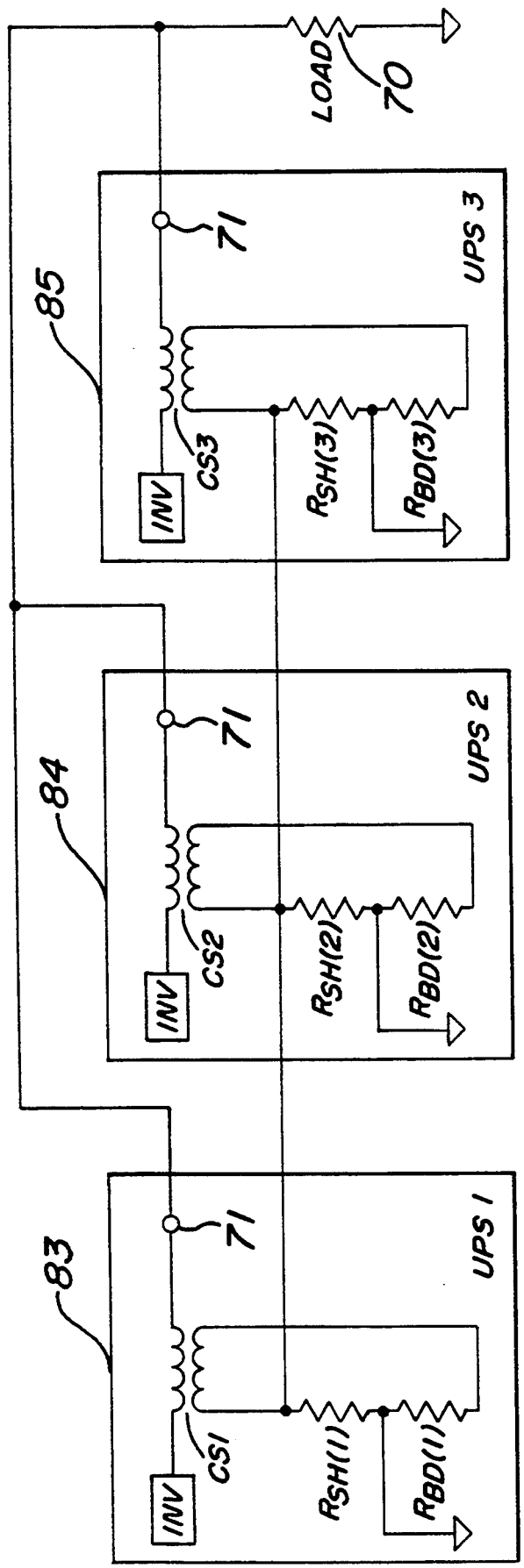
FIG. 3 is a system block diagram showing the interconnection of three UPS devices 83, 84, 85.

Referring further to FIG. 2 and FIG. 3, the criteria for selecting $R_{SH}$ and $R_{BD}$ are now discussed.

FIG. 2 shows the interconnection of $R_{SH}$ and $R_{BD}$ for each of three devices, while FIG. 3 shows the interconnection of three UPS devices 83, 84 and 85 respectively. It is required that $V_{SH}$, the voltage across each $R_{SH}$, equals $V_{BN}$, the voltage across $R_{BN}$ for each unit, when the load is proper. This situation is independent of the mix of UPS unit ratings, i.e., the load to be carried by each unit. Consequently, whatever the mix, $R_{SH(n)} = R_{BD(n)}$ for each of the n units. However, if the units have different ratings, then each $T_{SH}$ is selected to compare to each other $R_{SH}$ in inverse proportion to the relative amount of load carried. In general, whether the UPS units are of the same or different rating, the following apply:

(1) $V_{SH} = V_{BD}$ (when current is shared as designed);
(2) $R_{SH(n)} = R_{BD(n)}$;
(3) $R_{SH(n)} = K \times 1/I(n)$ where I(n) is the rated load to be carried by the nth UPS unit and where K is a constant of proportionality dependent on the required input impedance to amplifier 77 and the loading characteristics of the current-controlled current source 72; and
(4) $R_{SH(n)} = I_{max}/I(n) \times R_{(min)}$ where $R_{min}$ is $R_{SH}$ for the unit carrying the maximum current load, $I_{(max)}$.

The following examples are illustrative:

TABLE 2

|  | Unit 1 | Unit 2 | Unit 3 |
|---|---|---|---|
| Combination A | | | |
| Rated Load | $1I_O$ | $1I_O$ | $2I_0$ [$I_{(max)}$] |
| $R_{SH (n)}$ (ohms) | 2/5 | 2/5 | 1/5 [$R_{SH(min)}$] |
| $R_{BD}$ (ohms) | 2/5 | 2/5 | 1/5 |
| Combination B | | | |
| Rated Load | $3I_0$ [$I_{(max)}$] | $2I_0$ | $1I_O$ |
| $R_{SH}$ (ohms) | 2/11 | 3/11 | 6/11 |
| $R_{BD}$ (ohms) | 2/11 | 3/11 | 6/11 |
| $V_{SH(n)} = V_{BD}(n) = 6/11\ I_0$ volts, when system balanced | | | |
| Combination C | | | |
| Rated Load | $1I_O$ | $1I_O$ | $1I_O$ |
| $R_{SH}$ (ohms) | ½ | ½ | ½ |
| $R_{BD}$ (ohms) | ½ | ½ | ½ |
| $V_{SH(n)} = V_{BD}(n) = \frac{1}{2} I_0$ volts, when system balanced | | | |

It is thus seen that a very simple and effective technique is provided for modifying any UPS or equivalent unit for placing it in parallel with any mix of other UPS units. A plug-in combination of $R_{SH}$ and $R_{BD}$ can be utilized, following formulas (2) and (4) above. There is provided an improved UPS adapted for paralleling with other UPS units, which very simply provides for balancing the load to be carried by each unit, and also effectively and efficiently balances harmonics in the load current. The load current is shared in the same ratio as the power rating of the inverters when placed in parallel, and the error signal representing the difference from rated current is generated by an impedance transform which represents the output impedance of the inverter circuit. All of these features are accomplished with the simple circuit of the form illustrated, which utilizes only four operational amplifiers.

In addition to UPS devices, the basic invention is applicable to any power-sharing devices that are paralleled across a load, where there is a need to balance the load provided by each device. In accordance with the formulas (1)–(4) above, such a system can easily provide for balancing of three or more such power-supplying circuits.

We claim:

1. A system of a plurality of devices parallel connected to a load, each said device having an inverter circuit with an output connected to deliver current to said load, said current having a fundamental and harmonics, said harmonics having a frequency range, each said device comprising:
   feedback control means for controlling the output load delivered by said inverter, said feedback control means comprising an impedance which substantially matches the effective output impedance of said inverter through said harmonic frequency range.

2. The system as described in claim 1, wherein said devices are UPS devices and each of said UPS devices has a designated current share to be delivered to said load, and wherein said feedback means comprises an error signal means for generating an error signal representative of the difference between said designated shared current and actual current.

3. The system as described in claim 2, wherein said feedback control means comprises means for transforming said error signal by a transform representative of said effective inverter output impedance.

4. The system as described in claim 3, wherein said transforming means comprises hardware components.

5. The system as described in claim 2, wherein said feedback loop comprises current sense means for sensing the actual current being delivered by said each UPS device.

6. A system having a plurality of UPS devices adapted to be parallel connected to a load in parallel, characterized by:
   each said UPS device being designated to provide a predetermined share of load current and at least one of said UPS devices having a designated load different from another of said UPS devices, each said device further having an inverter circuit with an output connected to deliver current to said load, and an error circuit having an element with a resistive value compared to the corresponding elements of the others of said devices which is inversely proportional to its predetermined share of load current.

7. The system as described in claim 6, wherein said each UPS device has a feedback means which comprises said error circuit for generating an error signal representative of the difference between said designated shared current and actual current.

8. The system as described in claim 7, wherein said inverter circuit has an effective output impedance, and said feedback means comprises means for transforming said error signal by a transform representative of said effective inverter output impedance.

9. The system as described in claim 8, wherein said transforming means comprises hardware components.

10. The system as described in claim 7, wherein said feedback means comprises current sense means for sensing the actual current being delivered by said each UPS unit device.

11. The system as described in claim 6, wherein said error circuit comprises a resistive network for generating said error signal, said element being a share resistor in said resistive network.

12. The system as described in claim 6, wherein each said share resistor of each said UPS device is in parallel with each other share resistor of the other parallel UPS devices.

13. The system as described in claim 12, wherein said error circuit comprises a second resistor having the same value as said share resistor.

14. A method of providing a plurality of UPS devices parallel connected to a load, each of said devices having a designated share of the total load current to be delivered to said load, each said device having provided therein a control circuit which incorporates a network for determining the error difference between the current being delivered and the designated share of current to be delivered, and comprising selecting and incorporating into each said network a resistive component inversely proportional to the designated share of current for said device.

15. A system having a plurality of power-supplying circuits connected in parallel to supply power to a common load, each said power-supplying circuit having a designated share of the common load and at least one of said circuits having a designated load different from another of said circuits, and each of said circuits having a feedback loop for controlling the power supplied by said each circuit to be held at said designated share, each said feedback loop having an error circuit, each said error circuit being connected to each other error circuit by a common connection, each said error circuit further comprising a circuit element selected to have a predetermined correspondence to the designated share of its power-supplying circuit.

16. The system as described in claim 15, wherein said system comprises at least three of said power-supplying circuits.

* * * * *

UNITED STATES PATENT AND TRADEMARK OFFICE
CERTIFICATE OF CORRECTION

PATENT NO. : 5,436,512
DATED : July 25, 1995
INVENTOR(S) : Haroon Inam et al.

It is certified that error appears in the above-indentified patent and that said Letters Patent is hereby corrected as shown below:

At column 5, line 52, $T_{SH}$ should be --$R_{SH}$--

Signed and Sealed this

Twenty-fourth Day of October, 1995

Attest:

BRUCE LEHMAN

Attesting Officer        Commissioner of Patents and Trademarks